United States Patent [19]
Hodges

[11] Patent Number: 5,706,751
[45] Date of Patent: Jan. 13, 1998

[54] EXTERNAL RAIL SYSTEM FOR A BOAT

[76] Inventor: Christopher A. Hodges, 706 Greatplain Ave., Needham, Mass. 02192

[21] Appl. No.: 410,063

[22] Filed: Mar. 24, 1995

[51] Int. Cl.⁶ .................................................. B63B 59/02
[52] U.S. Cl. ....................................... 114/219; 114/343
[58] Field of Search .............................. 114/219, 343, 114/283, 288, 290; 293/128

[56] References Cited

U.S. PATENT DOCUMENTS

| | | | |
|---|---|---|---|
| 2,959,146 | 11/1960 | Erkert | 114/219 |
| 3,449,917 | 6/1969 | Roskopf | 114/219 |
| 4,084,533 | 4/1978 | Boyer | 114/219 |

FOREIGN PATENT DOCUMENTS 946811  1/1964  United Kingdom ............... 114/219

*Primary Examiner*—Jesus D. Sotelo
*Attorney, Agent, or Firm*—Paul J. Cook

[57] ABSTRACT

A rail system for a boat is provided which includes a rail having a shock absorbing channel in the top surface of the rail and extending the length of the rail. The rail has a side surface which is adhesively secured to a hull of the boat. A bottom surface of the rail can be rendered concave or be provided with a plurality of channels to deflect water away from the boat.

7 Claims, 15 Drawing Sheets

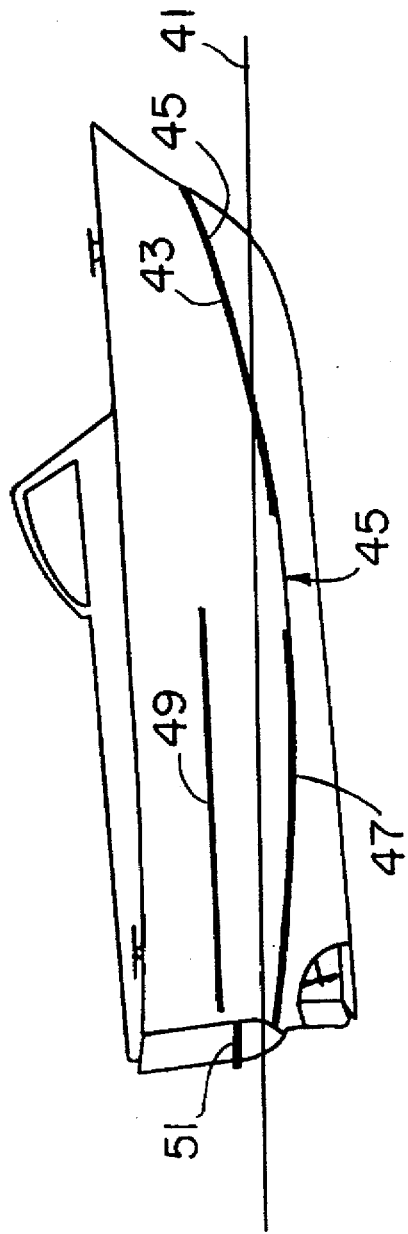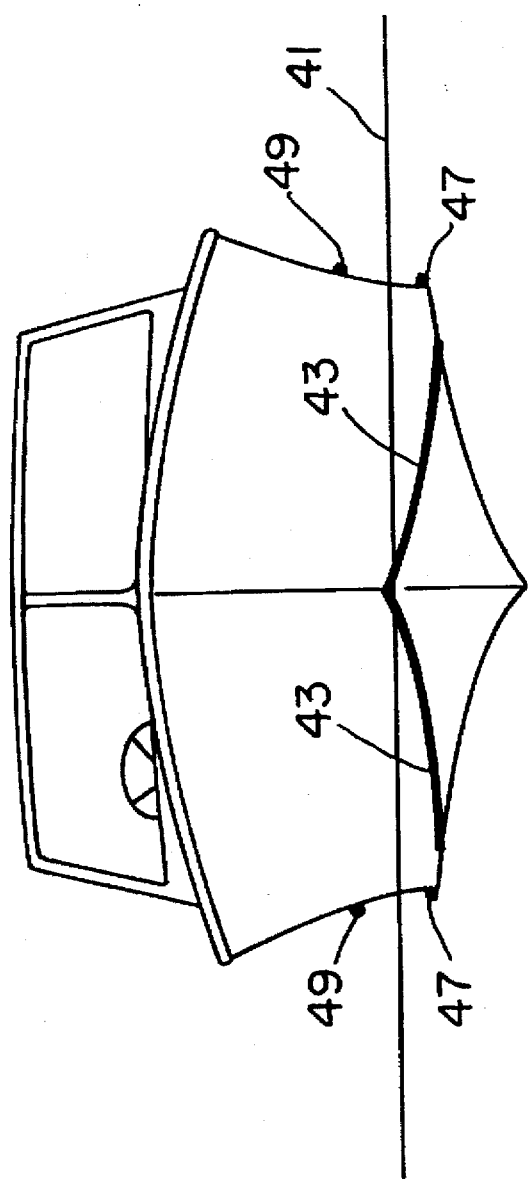

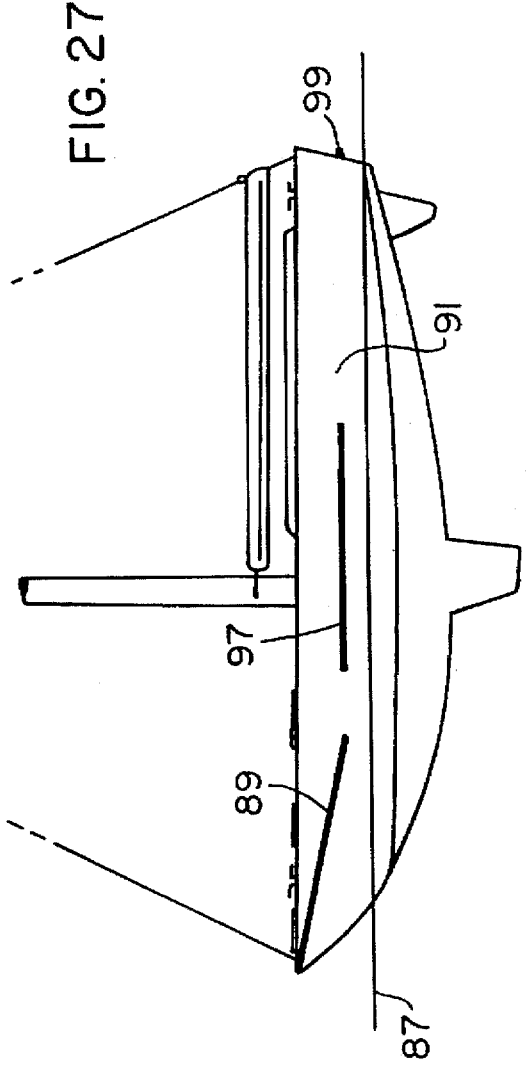
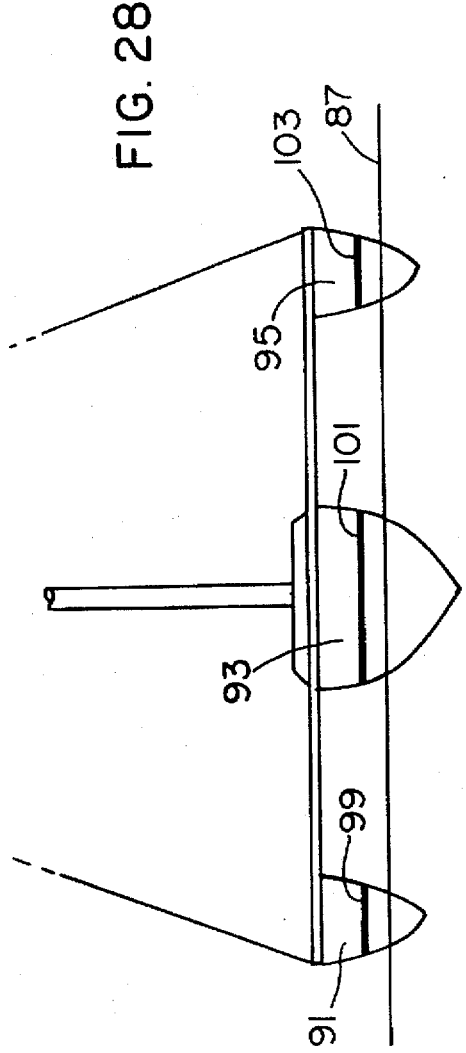

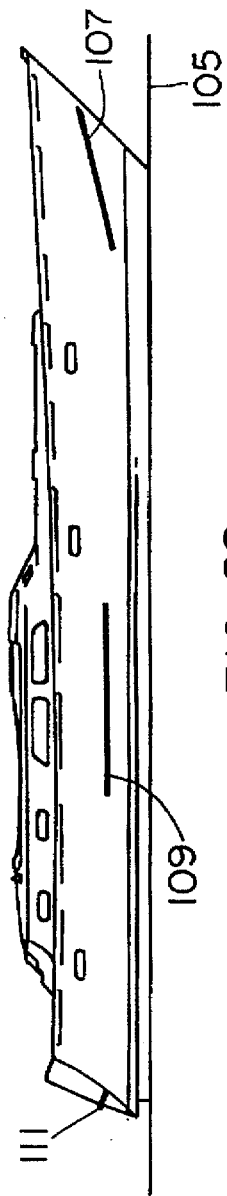
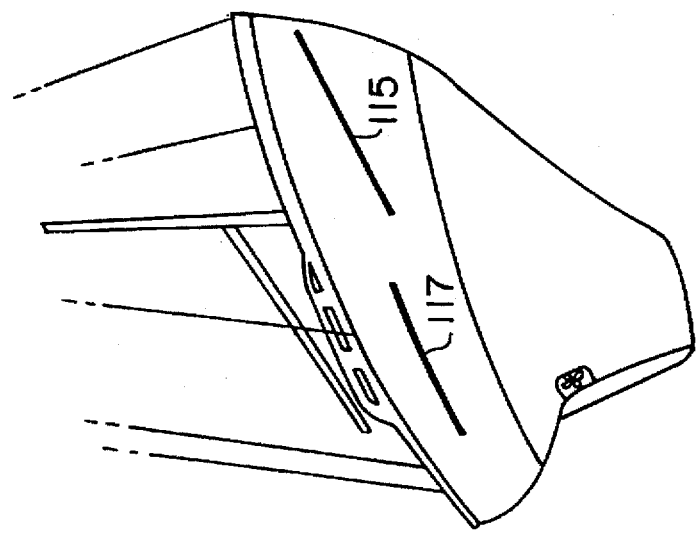
FIG. 29
FIG. 30

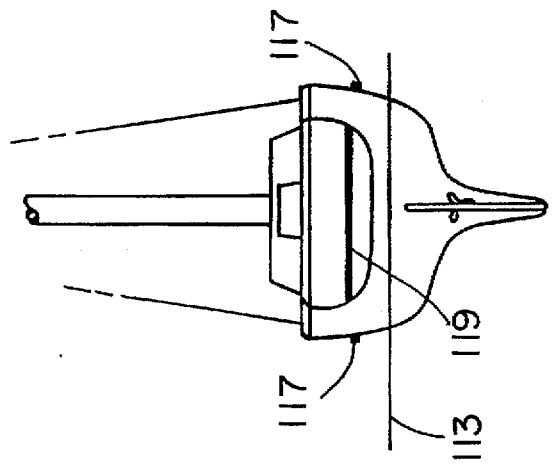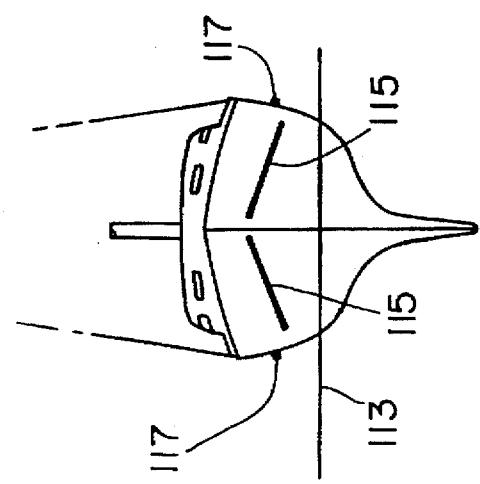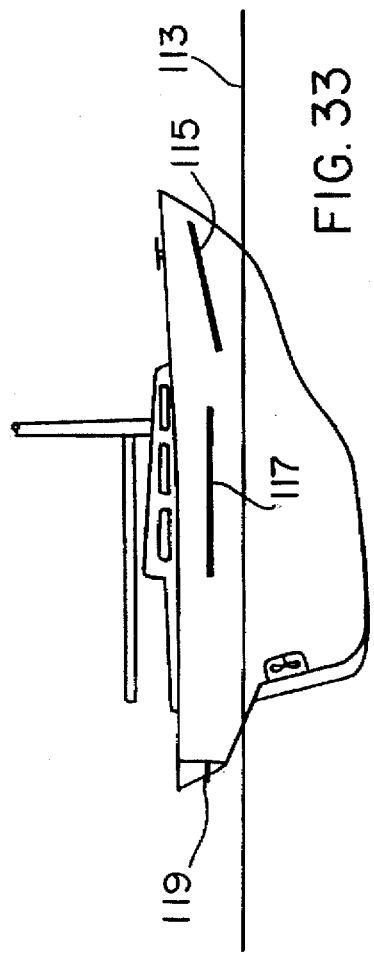

EXTERNAL RAIL SYSTEM FOR A BOAT

BACKGROUND OF THE INVENTION

This invention relates to a rail structure utilizing the rail structure and to an external rail system utilizing the rail structure affixed to the hull of a boat in order to control water spray and control direction of the boat during use of the boat. The problem in the art to which this invention appertains are the need for an external rail system for boats in which elongated rails are structurally affixed to the external surfaces of boat hulls and by which such rails collectively have, some and in some cases all, of the following functional attributes of deflecting spray; of reducing the tendency of the bow to go under in choppy or turbulent seas; of reducing heel and side-slipping while turning; of contributing lift to a fast-moving hull; of acting as a fender to protect the hull; of contributing to a safety factor by providing an accessible hand hold or foot step for swimmers or a man overboard; of reducing the rocking motion of the boat while moored or anchored; and of adding flotation to the boat. Also the rail will provide for a softer boat ride.

Prior to the present invention, it has been proposed by Glass, U.S. Pat. No. 3,361,104 to provide rails in the hull of a boat in order to reduce pounding of the boat during use. The rails are generally triangular in shape having a sharp point at the position of the rail most distant from the boat hull. The exposed unsupported surfaces are easily deformed through accidental contact during use. In addition, the sharp edge of the rail and its position is inefficient in deflecting spray away from the boat interior during use. Glass rails were not successful because of the bond failure between the resilient material and the base attachment.

It has been proposed in French Patent 762,452 of Derro to utilize an attachment fitted to the submerged section of a boat hull to provide a planing surface to effect a lifting force on a boat hull during use. The attachment includes a series of truncated triangles when viewed in cross-section. Since the attachment is submerged, and is on the bottom of the boat hull, it does not provide water spray control from the exposed hull surface during use of the boat.

It has been proposed in applicant's U.S. Pat. Nos. 5,205,235 and 5,313,907 to provide an external rail system for boats which is formed from rails having an external skin and a shaped polymeric foam confined within the skin. One surface of the rails adjacent the water surface of the rails is smooth and reliance is made upon the overall shape of the rail to send spray water in the desired direction. It has been found that these designs, while effective for their intended purpose, are expensive to produce and are somewhat limited under relatively severe wave conditions to direct spray in the desired manner.

It has also been proposed in U.S. Pat. No. 5,237,953 to provide a water deflecting rail with a bottom surface adjacent the water surface which is shaped to deflect water spray back to the water surface.

It would be desirable to provide a boat rail and a boat rail system which can be easily and permanently attached to a boat hull, which is sufficiently strong to retain its shape during normal boat use and which can be positioned anywhere on a boat hull to provide spray control or control of the boat direction during use.

SUMMARY OF THE INVENTION

The present invention provides boat rails which can be permanently secured to any position on a boat hull and a boat rail system for controlling water spray and boat direction during use. The rails are formed of a solid shaped polymeric material of suitable density to provide mechanical strength. The rail includes at least one shock-absorbing channel which extends the length of the rail which permits the rail to flex and thereby to function as a shock absorber. An element such as a tube, rod, rope, plug or series of plugs or the like can be at least inserted into the one channel to provide additional strength for the rail and to also function as a shock absorber. The shock absorbing channel(s) can be closed or open to a rail surface. The rail also has a side surface which is adhered to a boat hull. In one embodiment of this invention, the rail also can have a bottom exposed surface having channels. The channels in the bottom surface collect and direct spray downwards toward the surface of the water. In addition, the bottom surface channels receive water spray from the moving boat hull and absorbs the force of the moving spray. By virtue of the absorbed force transmitted to the hull, control of the direction of moving can be improved and give the boat a softer ride.

The bottom surface channels also extend through all or substantially all of the length of the rail. The side wall of the rail attached to the hull can include one or more troughs into which an adhesive can be placed to adhere the rail to the hull. In addition, the side wall adhered to the hull can include a tape having adhesive on both surfaces which serves to assist in positioning the rail on the hull.

In the external rail system, the rails are discretely positioned and installed by structural bonding to the external surface of a boat hull. Collectively, the rails, as discretely positioned, and affixed, will have some if not all, of the following functional attributes, to wit; to deflect spray away from the boats; to reduce the tendency of the bows of the boats to move under the water surface while moving through choppy or turbulent seas; to reduce heel and side-slipping of the boats while turning; to contribute a degree of lift to the hulls of fast-moving boats; to act as a fender to protect the hulls of boats; to contribute a safety factor by providing accessible hand holds or foot steps for a person in the water, by which access to the boats can be gained; to reduce the rocking motions of boats while moored or anchored brought about by the wakes from another moving boat; to add flotation to the boats and to provide for a softer ride.

BRIEF DESCRIPTION OF THE DRAWINGS

FIGS. 11–14 are starboard-side elevational, front-elevational, full-rear (and partial starboard side and partial bottom) perspective, and full port-side and full-bottom (and partial starboard-side) perspective views, respectively, of a typical flat bottomed runabout boat.

FIGS. 25–28 are perspective, front-elevational, port-side elevational and rear-elevational views, respectively, of a multi-hulled (trimaran) sailboat.

FIG. 29 is a starboard-side-elevational view of a sailboat having a reverse transom.

FIGS. 30–33 are perspective, front-elevational, rear-elevational and starboard-side views, respectively, of a displacement-type fixed-kneel sailboat.

Figure 1A:
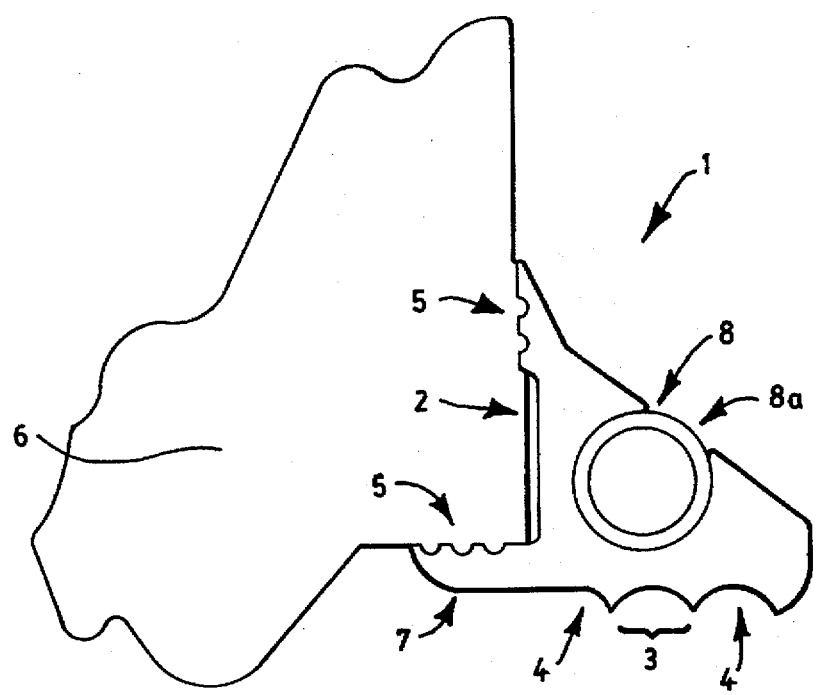
FIG. 1a is a cross-sectional view of a rail of this invention including a horizontal tail.

Hereinafter, throughout the specification, "installed" will mean the discrete positioning and emplacement of an elongated rail on a hull surface, together with the structural bonding of such rail where it was discretely positioned and emplaced on the hull surface.

Depending upon the types of boats to be described, the specific hull locations at which are rails are installed, and the discrete ranges of Durometer of the polymeric material for the various rails that are utilized, such rails will have the functional attributes denoted by the following letter codes:

A to deflect spray away from the boat

B to reduce the tendency of the bow to go under while the boat is moving through choppy or turbulent seas C to reduce heel and side-slipping of the boat while turning D to contribute a degree of lift to the hull(s) of a fast moving boat E to act as a hull-protecting fender F to provide accessible hand holds or foot steps for a man or woman overboard, or a swimmer, whether or not in distress, by which access to the boat can be gained G to reduce the rocking motion of a boat H to add additional flotation to the boat I to provide for a softer boat ride.

The rails of this invention are formed from a shaped solid polymeric material having a side surface and a bottom surface wherein the bottom surface includes channels. The channels function too direct water spray toward the surface of water upon which the boat is moving and to provide for a softer boat ride. The side wall can include one or more troughs into which adhesive can be placed which extend the length of the rail. In addition, a positioning tape having an adhesive on both of the surfaces can be utilized. The rail can be formed of any polymeric composition so long as it has a density or Durometer of sufficient mechanical strength to withstand normal forces during use while retaining its shape. Representative suitable polymeric compositions include polyethylene, polypropylene, polystyrene, polyvinylchloride or the like. Polyvinylchloride is preferred since it is mechanically strong and is available in a wide range of Durometer from about 65 to about 90 on the shore A scale. The greater the Durometer of the polymeric material, the greater the strength and structure rigidity imparted to the rail. The elongated rails, discretely positioned, emplaced and structurally affixed at various locations on the hull vary as to the discrete strength and rigidity required consistent with the functional attributes to be afforded. The surface of the rail is so that desirable control of water flow past the bottom base can be obtained to control splashing and boat direction. The top surface should have a width of at least about between 1½ inches and 3½ inches, side surface attached to the hull of a boat, of between about 1½ and 3½ inches, preferably between about 1½ and 2 inches and a bottom surface of between about 1¾ and 4 inches, preferably between about 2 and 2½ inches.

The troughs for adhesive, when included should have a depth of between about ⅛ and ⅜ inches, preferably about 0.025 and 0.045 inches. The channels in the bottom surface should have a depth between about 3/16 and about ½ inches.

Referring to FIG. 1a, the rail of this invention 1 includes a side surface 2 and a bottom surface 3 having a plurality of small channels 4 that have a width of between about ⅜ and 1 inches. The channels serve to deflect water downward toward the surface of the water on which the boat is floating. Two or more small adhesive troughs 5 are utilized to house adhesive to secure the rail 1 to a chine 5a on the hull 6 of a boat. The rail 1 includes a tail extension 7 which fits under the chine 5a on the hull 6. Adhesive such as an epoxy, a polyurethane or a methacrylate based adhesive, for example can be utilized. The rail 1 can include a hollow channel 8 extending the length of the rail 1 in order to provide a shock absorbing means in the rail. The channel 8 can house a tube 8a, or the like such as a rope, rod or plug(s) to provide additional shock absorbing function.

Figure 1B:
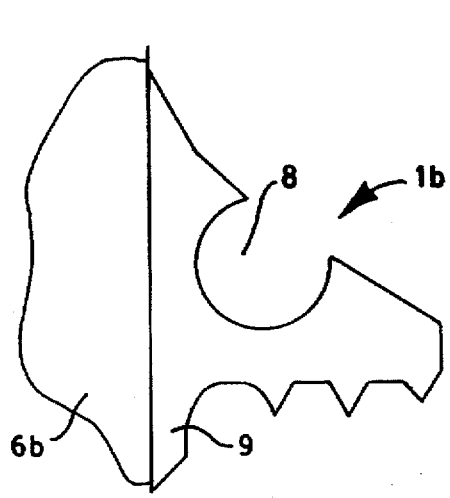
FIG. 1b is a cross-sectional view of a rail of this invention including a vertical tail.
Figure 1C:
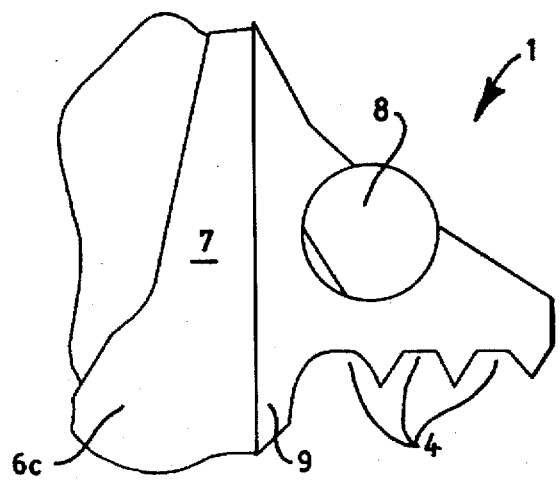
FIG. 1c is a cross-sectional view of a rail of this invention including a vertical tail and a tube or rod installed in a channel.

Referring to FIG. 1b, the rail 1b includes a shock absorbing channel 8. The rail 1b includes a vertical tail section 9 when the rail 1b is secured to a flat portion of a hull 6b. The rail 1c includes a vertical tail extension 9 and a tube or rod 8A when the rail 1c is secured to a flat surface. The rails 1a and 1b, and 1c can be secured to a hull by means of a two-sided adhesive tape or with a liquid adhesive or both.

Figure 2A:
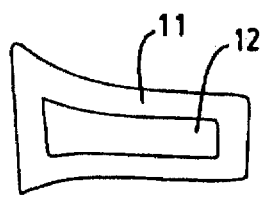
FIG. 2a is a cross-sectional view of a rail of this invention including a closed shock absorbing channel.
Figure 2B:
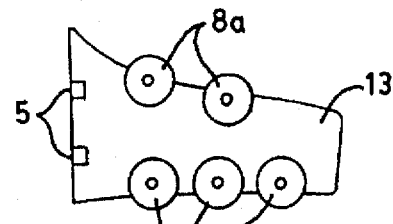
FIG. 2b is a cross-sectional view of a rail of this invention including a plurality of shock absorbing channels.
Figure 2C:
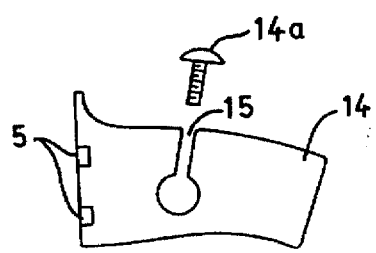
FIG. 2c is a cross-sectional view of a rail of this invention including a plug for a shock absorbing channel.
Figure 2D:
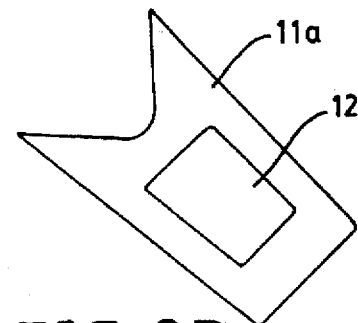
FIG. 2d is a cross-sectional view of the rail of FIG. 2a positioned at an angle.

Referring to FIG. 2a, the rail 11 includes a bottom surface 11a and a side surface 11b, the latter for attachment to a boat hull and a closed shock absorbing channel 12. Referring to FIG. 2b, the rail 13 includes a plurality of channels containing tubes 8a. The rail 13 includes two adhesive troughs 5, a bottom surface 13a and a side surface 13b. Referring to FIG. 2c, the rail 14 includes a shock absorbing slot-shaped channel 15 which can house a plurality of plugs 14a. The rail 14 includes a side surface 14b, a bottom concave surface 14c and two adhesive troughs 5. Referring to FIG. 2d, the rail 11d includes closed channel 12 which is applied to a hull at an angle. The rail 11d includes a bottom surface 11c and a side surface 11e.

Figure 2E:
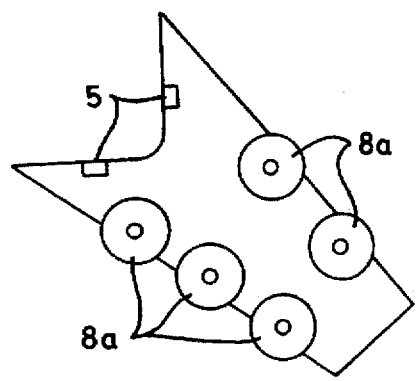
FIG. 2e is a cross-sectional view of the rail of FIG. 2b positioned at an angle.
Figure 2F:
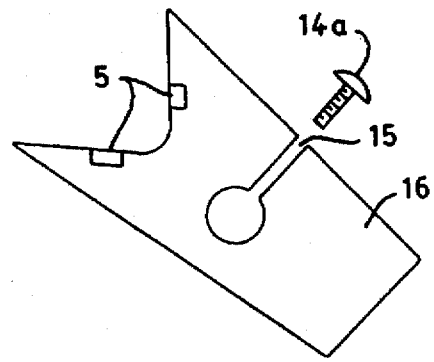
FIG. 2f is a cross-sectional view of the rail of FIG. 2c positioned at an angle.
Figure 2G:
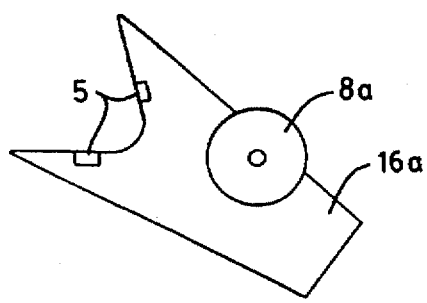
FIG. 2g is a cross-sectional view of the rail of FIG. 1a positioned at an angle.

Referring to FIG. 2e, the rail 13c includes channels containing shock absorbing tubes 8a and adhesive troughs 5. The rail 13c has a bottom surface 13d and a side surface 13e. Referring to FIG. 2f, the rail 16 includes a shock absorbing slot-shaped channel 15 which can house a plurality of plugs 14a and adhesive troughs 5. The rail 16 has a side surface 16a and a bottom surface 16b. Referring to FIG. 2g, the rail 16c includes a shock absorbing tube 8a and adhesive troughs 5. The rail 16c has a bottom concave surface 16d and a side surface 16e. The rails of FIGS. 2d, 2e, 2f and 2g can be applied to a hull at an angle.

Figure 6:
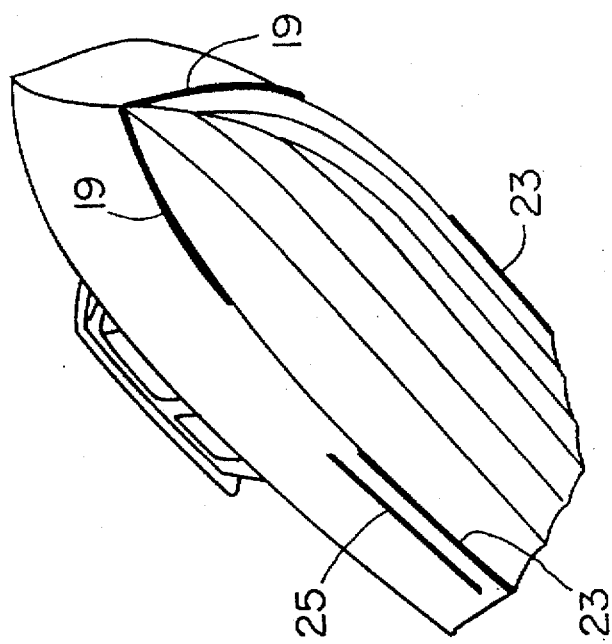
FIGS. 3–6 are front-elevational, starboard-side elevational and perspective views, respectively, of a boats having a displacement planing type or deep-v-hull.
Figure 3:
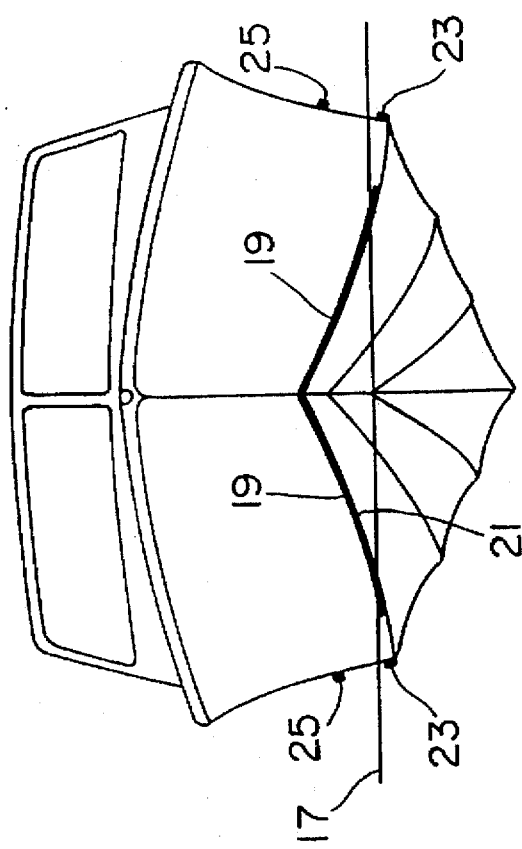
Figure 4:
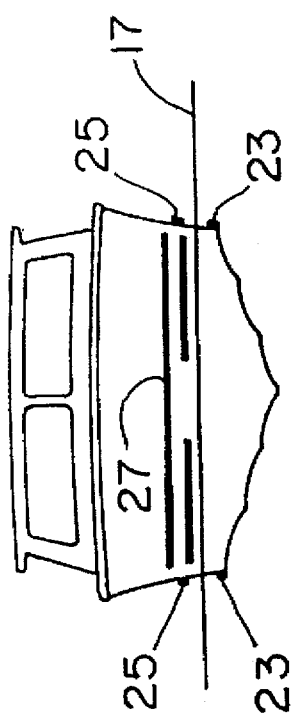
Figure 5:
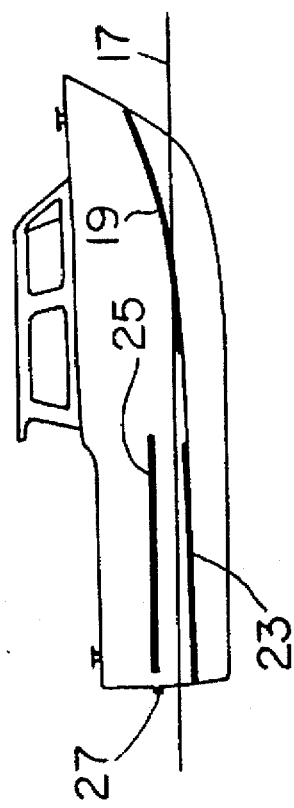

In FIGS. 3–6 which depict a boat having a displacement planning type of deep-v-hull. FIG. 3 is a front-elevational view. FIG. 4 is a rear elevational view. FIG. 5 is a starboard-side elevational view and FIG. 6 is a perspective view. A port-side elevational view would be the same as FIG. 5. The waterline is indicated by reference numeral 17. The bow rails 19 are installed, as shown (or sections of rail can be connected together) starting at the bow and running aft toward the stern sections with the bow rails 19 being positioned on the upper sides of or over the chine edges 21. The bow rails 19 can extend continuously from the bow to the stern of the boat. The Durometer of the bow rails range from 65 to 90 Shore A and the bow rails 19 have the functional attributes A, B, D, E, F, G, H and I. The fender rails 25 are similarly installed horizontally on both the starboard and port sides, 8" to 24" above the waterline 17. The stern rail 27 is horizontally installed across the full width of the transom, 6" to 10" above the waterline 17. The stern rail 27 or rails 27b may provide clearance for swim-platform brackets, boarding ladders, etc. The stern rails 27 and 27b have a Durometer ranging from 65 to 90 Shore A and their functional attributes are A, E, F and H.

Figure 7:
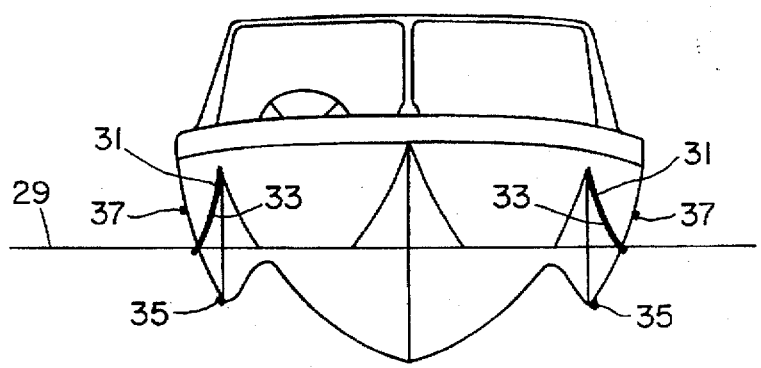
FIGS. 7–10 are front-elevational, port-side elevational and perspective views, respectively, of a boat having a cathedral planing type hull.
Figure 8:
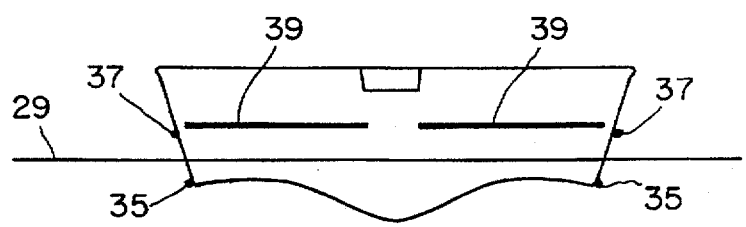
Figure 9:
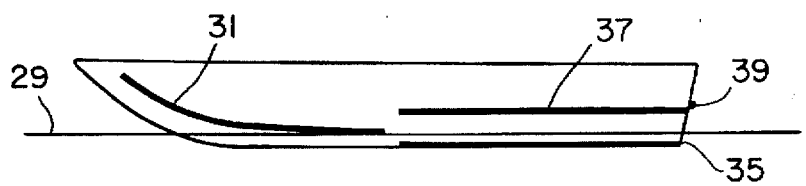
Figure 10:
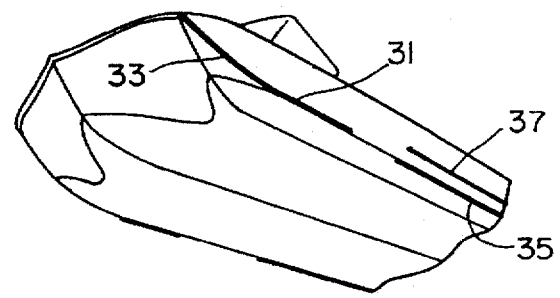

In FIGS. 7–10, which depict a boat having a cathedral plain type hull, FIG. 7 is a front-elevational view, FIG. 8 is a rear-elevational view of the hull. FIG. 9 is a port-side elevational view of the hull and FIG. 10 is a perspective view. A starboard-sideview would be the same as FIG. 9. The waterline 29 is indicated by reference numeral 29. The bow rails 31 are installed, as shown starting at the bow and running aft toward the stern sections, with the bow rails 31 being positioned on the upper sides of or over the chine edges 33. The bow rails 31 can run uninterruptedly from bow to stern. The bow rails 31 have Durometer ranging from 65 to 90 Shore A and functional attributes A, B, D, E, F, H and I. Rails are similarly installed, on both the port and starboard side, on or above the chine edges, starting from the stern and running to the midship sections. The rails 35 have Durometer ranging from 65 to 90 Shore A and functional attributes A, C, D, E, F, G, H and I. The fender rails 37 are similarly installed on both the port and starboard side, 8" to 24" above the waterline 29, and their dimensional lengths of the rails 35. The rails 37 have Durometer ranging from 65 to 90 Shore A and have functional attributes A, E, F and H. The stern rails 39, in two sections to provide space in the middle of the transom, 6" to 10" above the waterline 29. The stern rails 39 range in their Durometer from 65 to 90 Shore A and have functional attributes A, E, F and H.

Figure 13:
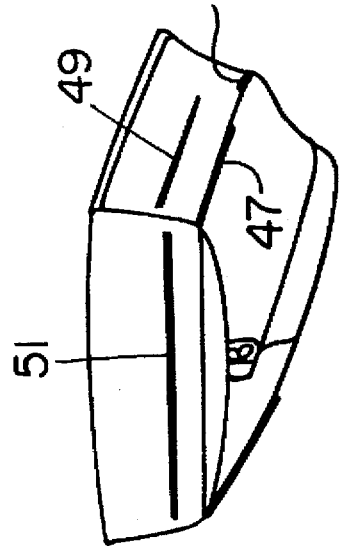
Figure 14:
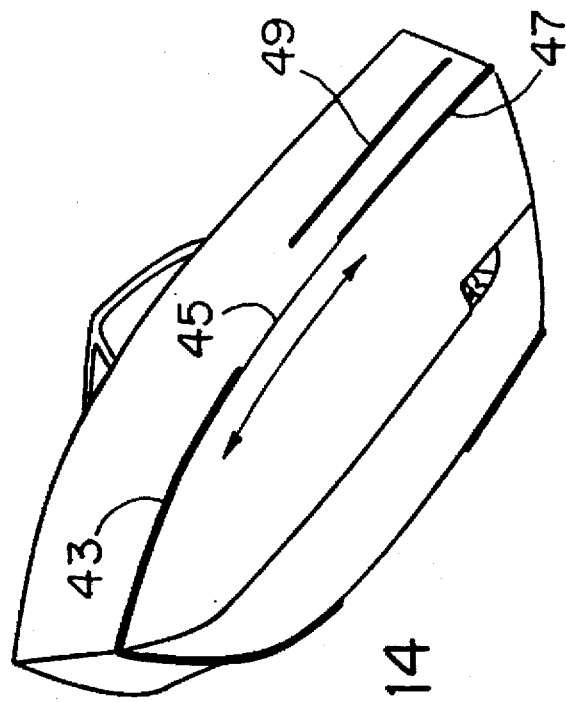

In FIGS. 11–14, which depict a typical flat-bottomed runabout boat, FIG. 11 is a starboard-side elevational view, FIG. 12 is a front elevational view. FIG. 13 is a perspective view from the rear and FIG. 14 is a perspective view. The waterline is indicated by reference numeral 41. The bow rails 43 can run uninterruptedly starting at the bow and running aft toward the stern sections, with the bow rails 43 being positioned on the upper sides or over the chine edges 45. The bow rails 43 have Durometers ranging from 65 to 90 Shore A and functional attributes A, B, D. E. F, H and I. Rails 47 are similarly installed, on both the port and starboard sides and running to the midship sections. The rails have Durometer ranging from 65 to 90 Shore A and functional attributes A, C, D, E, F, G, H and I. The fender rails 49 are similarly installed on both the port and starboard side, 8" to 24" above the waterline 41, and their dimensional lengths of the rails 47. The fender rails have Durometers ranging from 65 to 90 Shore A and have functional attributes A, E, F and H. The stern rail or rails 51, are horizontally installed, otherwise, across the full width of the transom, 6" to 10" above the waterline 41. The stern rail 51 can provide clearance for swim platform brackets, boarding ladders, etc. when installed as two or more sections. The stern rail 51 has its Durometer ranging from 65 to 90 Shore A and have functional attributes A, E, F and H.

Figure 15:
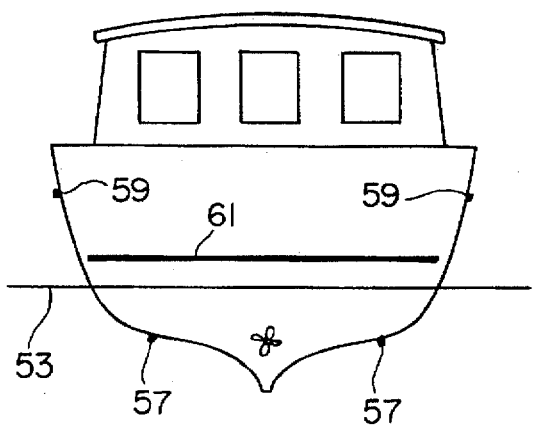
FIGS. 15–18 are rear-elevational, front-elevational, starboard-side elevational and perspective views, respectively, of a round-bottomed cruiser-type boat.
Figure 16:
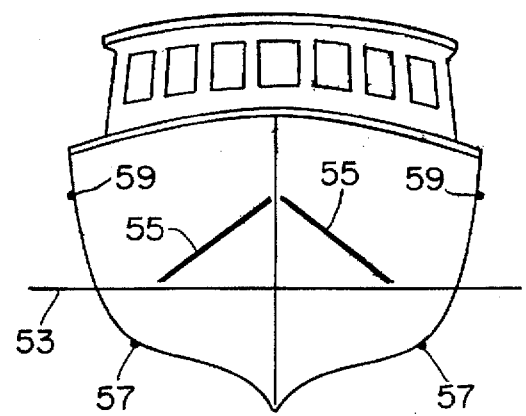
Figure 17:
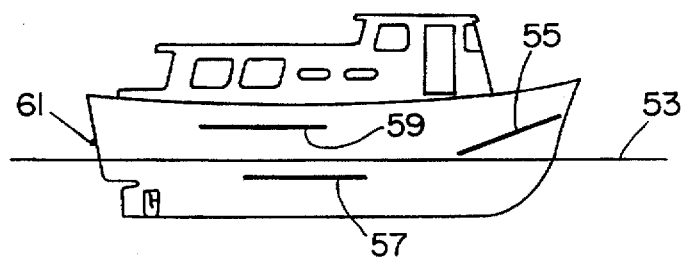
Figure 18:
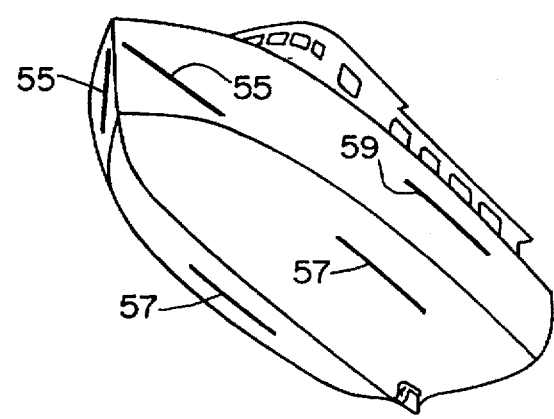

In FIGS. 15–18, which depict a round-bottomed cruiser-type boat, FIG. 15 is a rear elevational view, FIG. 16 is a front elevational view. FIG. 17 is a starboard-side elevational view and FIG. 18 is a perspective view. The waterline is indicated by reference numeral 53. For round-bottomed cruiser-type boats and sailboats whose hull lengths range from 28" to 40', the bow rails 55 are installed approximately 24" to 36" above the waterline 53, 2" back from the stem, running toward the waterline 53 at an acute angle of 0° to 30°. Assuming for purposes of trigonometric construction, with reference to FIG. 17, that the waterline 53 defines a coincident imaginary rectilinear base line and assuming that a second imaginary rectilinear line, coincident with the bow rail 55, is extended to intersect such base line; accordingly, such second line defines trigonometrically with such base line, from the aspect of counterclockwise rotation, such (positive) acute angle of about 5° to 30°. The bow rails 55 have Durometers ranging from 65 to 90 Shore A and functional attributes A, B, D. E. F, H and I. The bow rails 55 can extend continuously from bow to stern. Rail 57 are installed below the waterline 53, as shown, substantially amidships and approximately one-third of the distance from the waterline 53 to the keel. Rails 57 have Durometers ranging from 65 to 90 Shore A and functional attributes E, F, G and H. The fender rails 59 are horizontally installed across the full width of the transom, 6" to 10" above the waterline 53. The stern rail or rails 61 provide clearance for swim-platform brackets, boarding ladders, etc. The stern rail or rails has its Durometer ranging from 65 to 90 Shore A and have functional attributes A, E, F and H.

Figure 19:
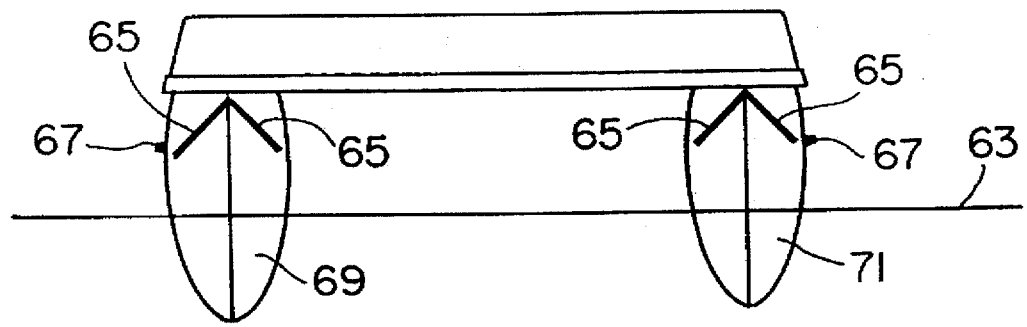
FIGS. 19–21 are front-elevational, starboard-side elevational and rear elevational views, respectively, of a double-hulled (catamaran) sailboat.
Figure 20:
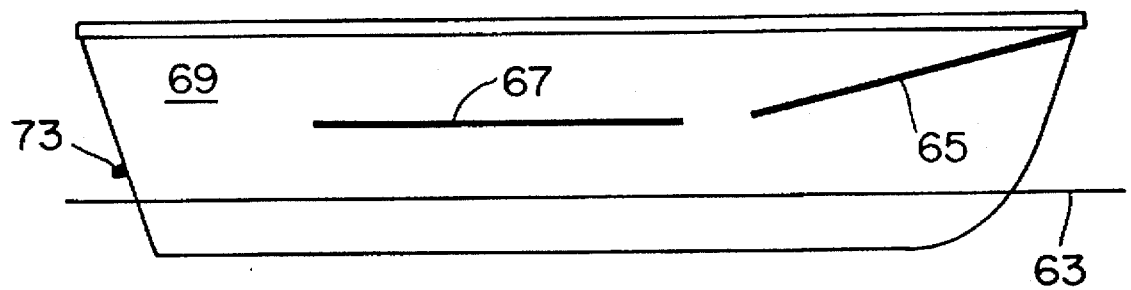
Figure 21:
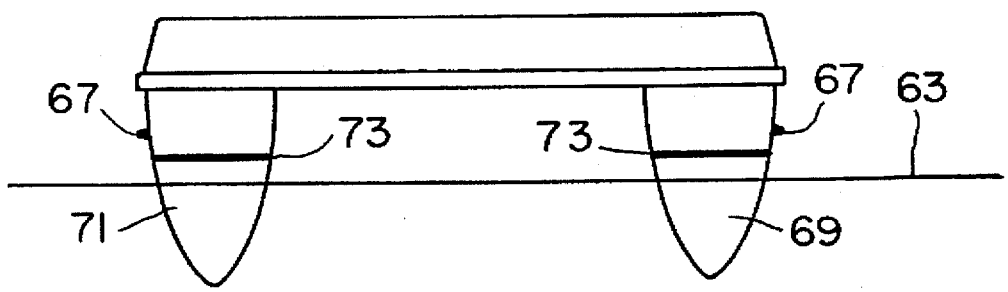

In FIGS. 19–21, which depict a double-hulled (catamaran) power boat FIG. 19 is a front-elevational view, FIG. 20 is a starboard-side elevational view and FIG. 21 is a rear elevational view/A port-side elevational view would be the same as FIG. 20. The waterline is indicated by reference numeral 63. The bow rails 65 are installed from the stem and run toward the waterline 63 at an acute angle ranging from 0° to 20° or can run continuously toward the stern. The bow rails 65 have Durometers ranging from 65 to 90 Shore A and functional attributes A, B, D, E, F, H and I. The fender rails 67 are horizontally installed substantially amidships at a distance of 8" to 24" above the waterline 63. Only two fender rails 67 are installed, one fender rail 67 being installed on the starboard side of the starboard hull 69 and the second fender rail 67 being installed on the port side of the port hull 71. The fender rails 67 have Durometers ranging from 65 to 90 Shore A and functional attributes E, F and H. One stern rail is horizontally installed across the full width of the transom of the port hull, 6" to 10" above the waterline 63 and the second stern rail 73 is horizontally installed across 6" to 10" above the waterline 63. Either or both stern rails 73 may spatially provide clearance when necessary. The stern rails 73 have Durometers ranging from 65 to 90 Shore A and functional attributes A, E, F and H.

Figure 22:
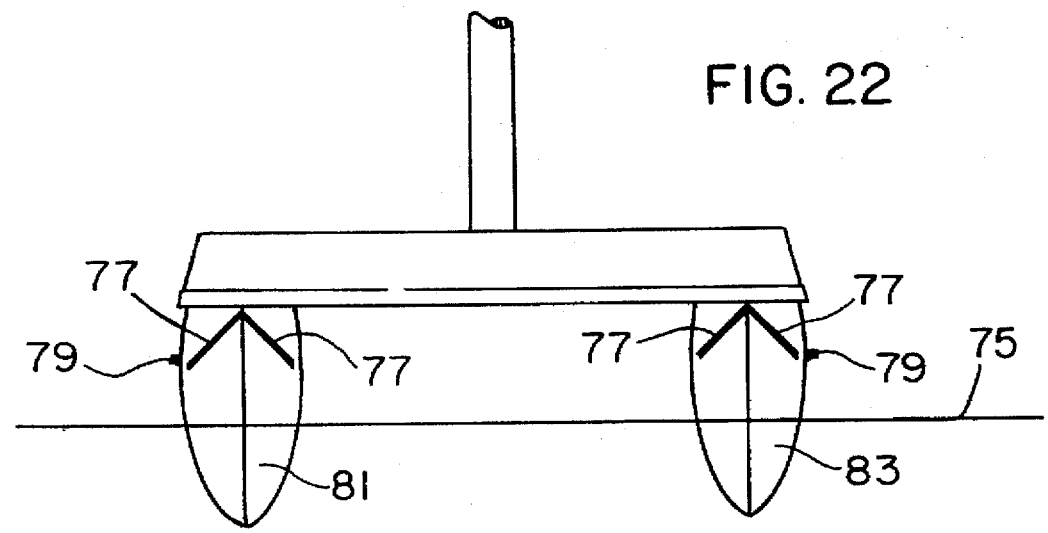
FIGS. 22–24 are front-elevational, starboard-side elevational and rear-elevational views, respectively, of a double-hulled (catamaran) sailboat.
Figure 23:
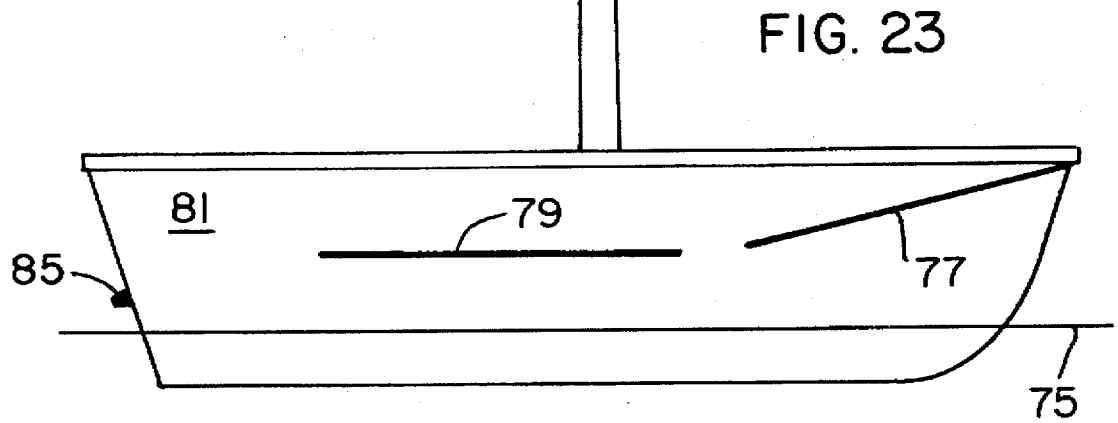
Figure 24:
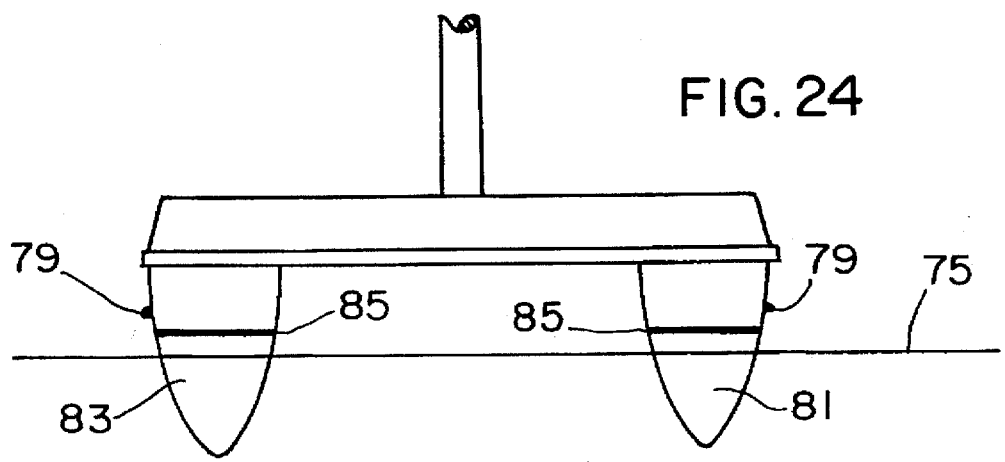

In FIGS. 22–24, which depict a double-hulled (catamaran) sail boat FIG. 22 is a front-elevational view, FIG. 23 is a starboard-side elevational view and FIG. 24 is a rear elevational view. A port-side elevational view would be the same as FIG. 23. The waterline is indicated by reference numeral 75. Reference numerals 81 and 83 are applied to the starboard hull and port hull, respectively. The bow rails 77, fender rails 79 and stern rails 85 are installed the same as respective bow rails 65, fender rails 79 and stern rails 73 and have been described with reference to FIGS. 19–21, and have the same respective densities and functional attributes.

Figure 25:
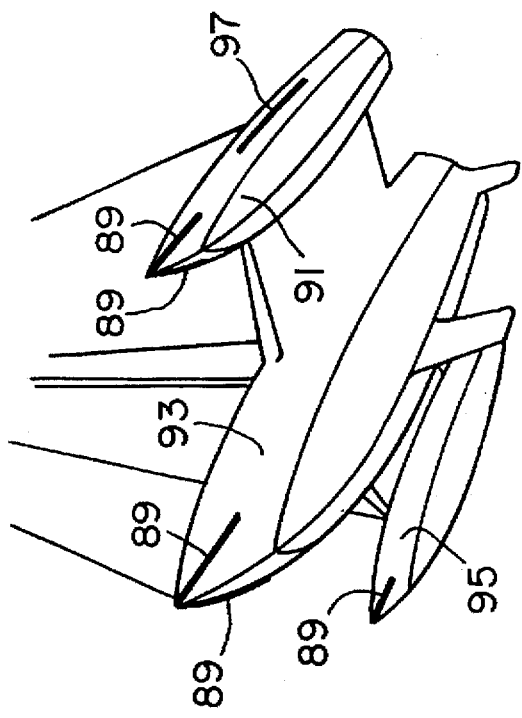
Figure 26:
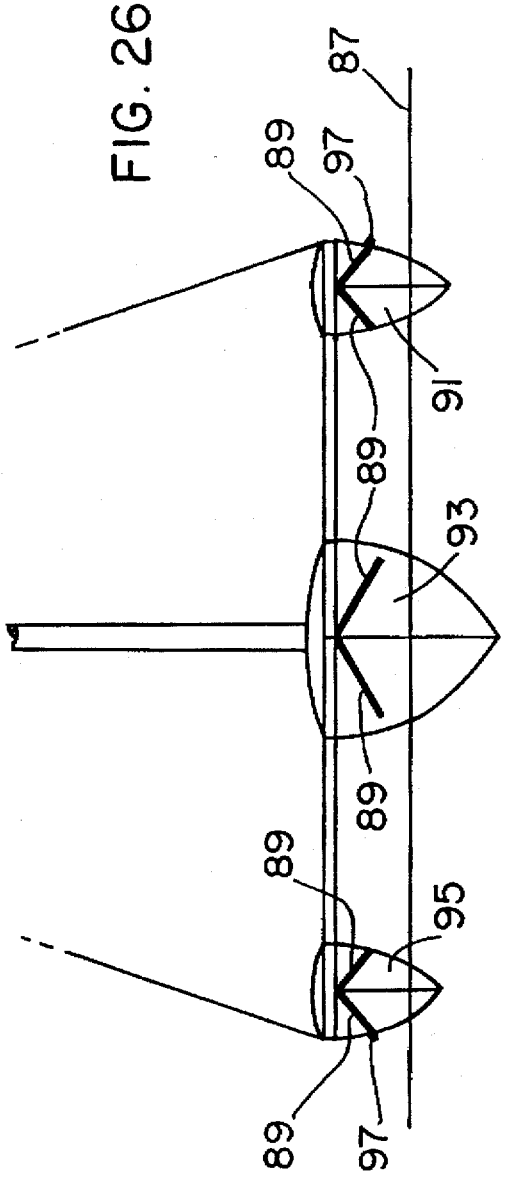

In FIGS. 25–28, which depict a multihulled (trimaran) sailboat FIG. 25 is a perspective view, FIG. 26 is a front elevational view. FIG. 27 is a port-side elevational view and FIG. 28 is a rear elevational view. A starboard-side elevational view would be the same as FIG. 27. The waterline is indicated by reference numeral 87. The bow rails 89 are installed at the stems of each of the port, center and starboard hulls 91, 93 and 95 and run toward the waterline 87 at an acute angle of 0° to 20° or can run continuously toward the stern. The bow rails 89 have Durometers ranging from 65 to 90 Shore A and functional attributes A, B, D, E, F, H and I. Only two fender rails 97 are horizontally installed amidships, 8" to 24" above the waterline 87, the one fender rail 97 being installed on the port side of the port hull 91 and the second fender rail being installed on the starboard side of the starboard hull 95. The fender rails 97 have Durometers ranging from 65 to 90 Shore A and functional attributes E, F and H. One stern rail 99 is horizontally installed across the full width of the transom of the port hull 91, 6" to 10" above the waterline 87; a second stern rail 101 is horizontally installed across the full width of the transom of the center hull 93, 6" to 10" above the waterline 87. The stern rails 99, 101 and 103 have Durometers ranging from 65 to 90 Shore A and functional attributes A, E, F and H.

FIG. 29 depicts a starboard-side elevational view of a sailboat having a reverse transom whose bottom edge is above the waterline, indicated by reference numeral 105. The said boat is depicted with its mast removed. A port-side elevational view would be the same as a FIG. 29. For hull lengths ranging from 28' to 40', the bow rails 107 are installed approximately 24" to 36" above the waterline 105, 2" back from the stem and running toward the waterline or stern at an acute angle of 0° to 25°; for a hull length less than 28', the bow rails 107 are installed approximately 12" to 24" above the waterline 105, 2; back from the stem and running toward the waterline or stern at an acute angle of 0° to 25°. The bow rails 107 have Durometers ranging from 65 to 90 Shore A and functional attributes A, B, D, E, F, H and I. All bow rails can run continuously from bow to stern. The fender rails 109 are horizontally installed on both the starboard and port sides, 8" to 36" above the waterline 105 running from amidships toward the stern. The fender rails 109 can also be run the entire length have Durometers ranging from 65 to 90 Shore A and functional attributes E, F and H. The stern rail 111 is horizontally installed the full width of the reverse transom at a distance of/to/the distance up the reverse transom. The stern rail has Durometers ranging from 65 to 90 Shore A and functional attributes A, E, F and H.

In FIGS. 30–33, which depict a round-bottom, fixed keel sailboat FIG. 30 is a perspective view, FIG. 31 is a front-elevational view. FIG. 32 is a rear-elevational view and FIG. 32 is a starboard-side elevational view. A portside elevational view would be the same as FIG. 33. The waterline is indicated by reference numeral 113. For hull lengths ranging from 28 to 40', the bow rails 115 are installed 12" to 36" above the waterline 112, 2" back from the stem and running toward the waterline 113 or stern at an acute angle of 0° to 25°. The bow rails 115 have Durometers ranging from 65 to 90 Shore A and functional attributes A, B, D, E, F, H and I. All bow rails can run continuously from bow to stern. As shown, the fender rail 117 have Durometers ranging from 65 to 90 Shore A and functional attributes E, F, and H. As shown, the stern rail 119 is horizontally installed across the full width of the raised transom at a level/to/the distance up the face of the raised transom. The Durometer of the stern rail ranges from 65 to 90 Shore A and functional attributes A, E, F and H.

Figure 34:
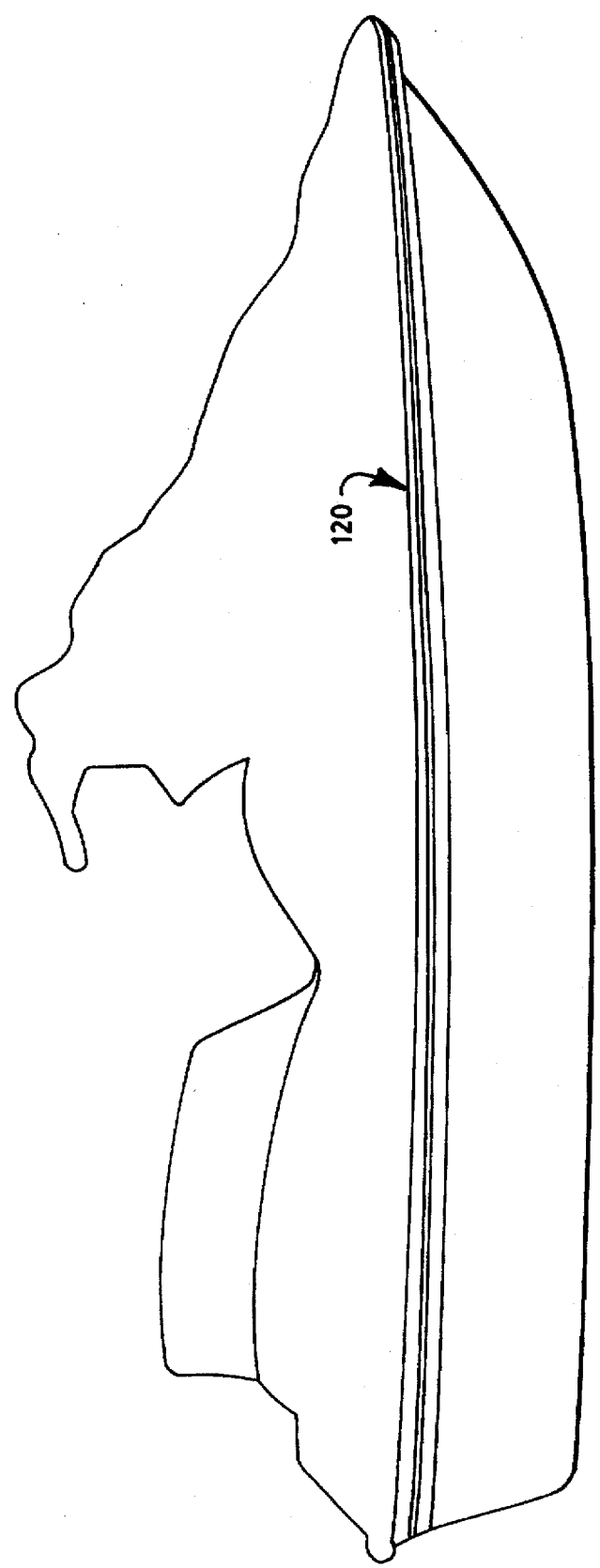
FIG. 34 is a starboard side view of the popular sport boat.

FIG. 34 illustrates a rail installed around the edge of a sport boat and has functional attributes A, B, C, D, E, H and I..

FUNCTIONAL ATTRIBUTE A

The rails that have functional attribute a deflect spray. For example, the bow of a boat, plowing through water, causes water spray to be churned up and which churned-up spray flows over and upon the starboard and port sides and into the boat. All rails that have functional attribute A, especially the bow rails, function as physical barriers to intercept such water spray and deflect such water spray away from the boat.

FUNCTIONAL ATTRIBUTE B

When the bow of a boat plows through choppy or turbulent seas, the water impacts the bow with such force that the bow goes under. The bow rails have functional attribute B in that such choppy or turbulent water, upon impacting the bow-installed rails, continuously acts as a lifting force component against the bow rails to raise the bow of the boat and thereby reduces the prior tendency of the bow to go under.

FUNCTIONAL ATTRIBUTE C

When a boat makes a starboard turn, for example, the resulting and reactive centrifugal force, depending upon the speed of the boat, will causae the port side of the boat to rise above the water or heel and to skip or side-slip to its port side. The starboard-side rail, having functional attribute C, grabs or bites the water to act like a brake upon or within the water, with the result that heel and side-slipping are reduced.

FUNCTIONAL ATTRIBUTE D

When the bow of the boat is speeding through the water, the plowed water will rise to impact the bow rails that have functional attribute D, with such water impacting against the bow rails and providing continuous impacting force against the bow rails to contribute to the hull. Likewise, other rails, having functional attribute D, are continuously impacted against by the water, thereby providing force components which effect a degree of lift to the hull.

FUNCTIONAL ATTRIBUTE E

All rails, having functional attribute E, act as fenders to protect the hull from damage when such rails come into contact with a dock, pier, pilings, other boats or floating objects. With reference to FIGS. 15–18, it could be said that the hull would be protected against damage if rail 57, possessing functional attribute G, is struck by a submerged log, aligned with rail 57.

FUNCTIONAL ATTRIBUTE F

The rails that have functional attribute F contribute a safety factor by providing an accessible hand hold or foot step for a man or woman overboard, or a swimmer, whether or not in distress, by which access to the boat can be gained, or simply hold onto such rail until help arrives for purposes of rescue.

FUNCTIONAL ATTRIBUTE G

Boats moored or anchored, are subjected to rocking movements, principally from the wakes caused by other boats. Boats are further subjected to rocking movements from the natural effects of wind and waves. The rails of boats that have functional attribute G resist rocking by grabbing or biting into the water.

FUNCTIONAL ATTRIBUTE H

Using a hollow or foamed tube or rod in the shock-absorbing channel(s) will give extra floatation to the boat when the rail is immersed in water.

FUNCTIONAL ATTRIBUTE I

Combining a soft shock absorbing tube or rod and the water deflecting teeth will provide for a soft boat ride.

I claim:

1. An elongated rail for installation on a hull of a boat, said rail having a top surface positioned away from a water surface surrounding said boat, said rail including at least one open shock absorbing channel extending into said top surface and extending the length of said rail, said rail being formed of a polymeric composition, a side surface of said rail shaped to be secured by an adhesive onto a surface of said hull and a bottom surface of said rail positioned adjacent the water surface surrounding said boat.

2. The rail of claim 1 having a plurality of channels wherein at least one of said channels is open and at least one of said channels is closed.

3. The rail of any one of claims 1 or 2 including a vertical extension extending from said bottom surface.

4. The rail of any one of claims 1 or 2 including a horizontal extension extending from said bottom surface.

5. The rail of any one of claims 1 or 2 wherein said bottom surface is concave.

6. The rail of any one of claims 1 or 2 wherein said bottom surface includes a plurality of channels.

7. The rail of any one of claims 1 or 2 wherein said side surface includes at least one adhesive trough.

\* \* \* \* \*